US006817502B2

(12) United States Patent
Gilstrap

(10) Patent No.: US 6,817,502 B2
(45) Date of Patent: Nov. 16, 2004

(54) BICYCLE WHEEL HOLDER

(75) Inventor: Keith Gilstrap, 818 Colorado Ave. #103, Glenwood Springs, CO (US) 81601

(73) Assignee: Keith Gilstrap, Glenwood Springs, CO (US)

(*) Notice: Subject to any disclaimer, the term of this patent is extended or adjusted under 35 U.S.C. 154(b) by 199 days.

(21) Appl. No.: 10/226,437

(22) Filed: Aug. 23, 2002

(65) Prior Publication Data

US 2004/0035898 A1 Feb. 26, 2004

(51) Int. Cl.[7] ................................................. B62J 7/00
(52) U.S. Cl. ...................... 224/426; 224/440; 224/445; 224/446; 224/448; 224/449; 224/460; 224/42.21
(58) Field of Search ................................ 224/425, 426, 224/427, 431, 440, 441, 443, 445, 446, 448, 449, 455, 456, 457, 458, 460, 461, 42.21, 42.26, 42.27, 42.3

(56) References Cited

U.S. PATENT DOCUMENTS

| | | | |
|---|---|---|---|
| 577,910 A | 3/1897 | Bierbach | |
| 672,540 A | * 4/1901 | Speir | ........................ 224/442 |
| 1,203,398 A | 10/1916 | Perkins | |
| 1,234,409 A | 7/1917 | Strifler | |
| 1,442,285 A | 1/1923 | McKay et al. | |
| 1,577,792 A | 3/1926 | Duck et al. | |
| 1,839,997 A | 1/1932 | Rutledge | |
| 1,886,549 A | 11/1932 | Howell et al. | |
| 3,338,484 A | * 8/1967 | Hall, Sr. | ..................... 224/442 |
| 4,437,597 A | 3/1984 | Doyle | |
| 5,085,360 A | * 2/1992 | Fortune et al. | .......... 224/42.13 |
| 5,242,183 A | * 9/1993 | Oberg et al. | ................ 280/293 |
| 5,437,171 A | 8/1995 | Owen | |
| 5,467,906 A | * 11/1995 | Forman | ..................... 224/426 |
| 5,558,261 A | 9/1996 | Hedeen | |
| 5,588,661 A | 12/1996 | Wolfe | |
| 5,639,001 A | * 6/1997 | Brady | ........................ 224/449 |
| 5,678,796 A | 10/1997 | James | |
| 5,692,659 A | 12/1997 | Reeves | |
| 5,702,040 A | 12/1997 | Hedeen | |
| 5,779,119 A | 7/1998 | Talbot et al. | |
| 5,810,231 A | 9/1998 | Kravitz | |
| 5,836,492 A | 11/1998 | Allen | |
| 6,336,649 B1 | 1/2002 | Lin | |

* cited by examiner

Primary Examiner—Stephen K. Cronin
(74) Attorney, Agent, or Firm—Leyendecker Law Offices; Kurt Leyendecker

(57) ABSTRACT

A holder for securing a bicycle wheel to the frame of a bicycle for transport is described. The bracket includes a padded hook member for placement over the top tube of a bicycle frame. The holder also includes two J-clamps for securing it to the seat and down tubes. A cradle is provided for receiving the rim of the bicycle wheel. Additionally to firmly secure the wheel to the holder two clamps are provided that limit the horizontal movement of the wheel and collectively prevent the wheel from moving upwardly or downwardly. The various clamps are adjustable for fitment of the holder to frames and wheels of differing sizes.

24 Claims, 5 Drawing Sheets

BICYCLE WHEEL HOLDER

BACKGROUND OF THE INVENTION

1. Field of the Invention

This invention relates generally to an assembly for holding a bicycle wheel. More specifically, the invention relates to a wheel holder removably mountable to a bicycle frame for carrying a bicycle wheel such as during the transport of the bicycle.

2. Description of the Relevant Art

Many types of roof top bicycle carriers require the front wheel of a bicycle be removed when mounting the bicycle on the carrier. The front wheel is typically stowed in the vehicle or is secured to the roof top carrier through a separate fixture that clamps the wheel at its axle. As can be appreciated, the wheel may be dirty especially if the wheel is from a mountain bike, and putting a dirty wheel in the vehicle is often undesirable. Dedicated roof top wheel fixtures solve this problem but they are often expensive and take up limited roof top space that could otherwise be used to carry additional bicycles.

Several holders have been proposed to solve the problem concerning where to secure the front wheel while a bicycle is being transported in a roof top carrier. In U.S. Pat. No. 5,588,661 of Wolfe, a bracket is disclosed that is affixed to the rear dropout of a bicycle frame. When the bicycle is placed in the roof top carrier, the axle of the front wheel is secured into a slot provided in the bracket by tightening the wheel's quick release mechanism. The bracket has several drawbacks. First, it is not easily removable from the bicycle and is intended to remain on the bicycle adding unnecessary weight. Second, since the front wheel is supported at the axle on only one side of the axle, the stress on the axle from the weight of the wheel and wind resistance during transport could cause damage to the axle and the wheel's hub.

In another U.S. patent, a bracket holder is discussed that clamps onto the seat post of a bicycle in includes space slots in which the axle of the front wheel is supported. A support arm of the holder extends a significant distance away from the clamp on one end thereof. It is to be appreciated that the wheel and the end of the support arm could interfere with mounting additional bicycle's on the rooftop carrier, especially when more than two bicycles are to be transported in a single carrier.

BRIEF SUMMARY OF THE INVENTION

A holder of a bicycle wheel for mounting on a frame of a bicycle is described. In one preferred embodiment, the wheel holder includes a framework with two or more coupling devices and one or more attachment devices attached to the framework. The two or more coupling devices are adapted to attach to one or more tubes of the bicycle frame at two or more locations while the one or more attachment devices are adapted to hold the bicycle wheel.

In another preferred embodiment, the wheel holder includes a framework with a hook and cradle coupled with the framework. The hook is adapted to hang over a top tube of the bicycle frame suspending the wheel holder from the frame. The cradle is adapted to receive a rim of the bicycle wheel therein, such that the wheel is essentially suspended from the wheel holder.

A preferred method of attaching a bicycle wheel to the frame of a bicycle is also described. First the wheel holder is suspended from a top tube of a bicycle frame. the wheel holder according to this embodiment includes (i) a framework, (ii) a hook coupled with the framework, the hook being adapted to hang over the top tube of the bicycle frame; (iii) a cradle coupled with the framework, (iv) at least one frame clamp attached to the framework, and (v) at least one wheel clamp attached to the framework. The wheel holder is then secured to one of a seat tube and a down tube of the bicycle frame using the at least one frame clamp. Next, the bicycle wheel is hung by its rim from the cradle. Finally, the bicycle wheel is secured to the wheel holder at the wheel's tire and/or rim using the at least one wheel clamp.

Other embodiments and variations thereof are contemplated and described below and in the appended claims.

DETAILED DESCRIPTION OF THE INVENTION

A bicycle wheel holder for attachment to the frame of a bicycle is described. A preferred embodiment of the holder is configured to be quickly and easily secured to a bicycle frame at three points. Accordingly, a bicycle without its front wheel can be mounted in a roof top carrier and the front wheel can be securely and quickly attached to the bicycle at a location that does not interfere with other bikes that are also mounted in the carrier.

Figure 1:
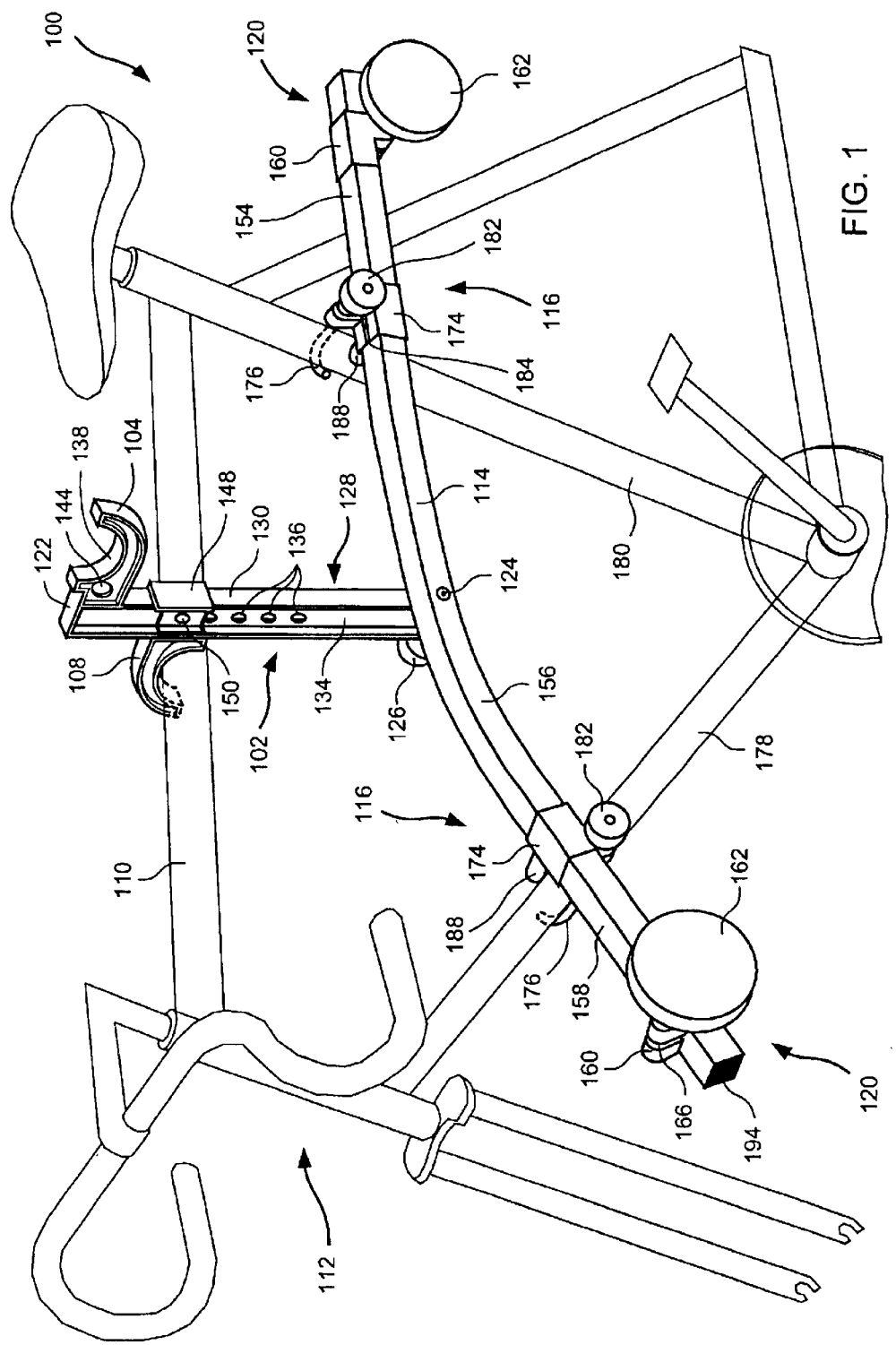
FIG. 1 is an isometric front view of a preferred embodiment of the wheel holder showing the holder attached to a bicycle frame.
Figure 2:
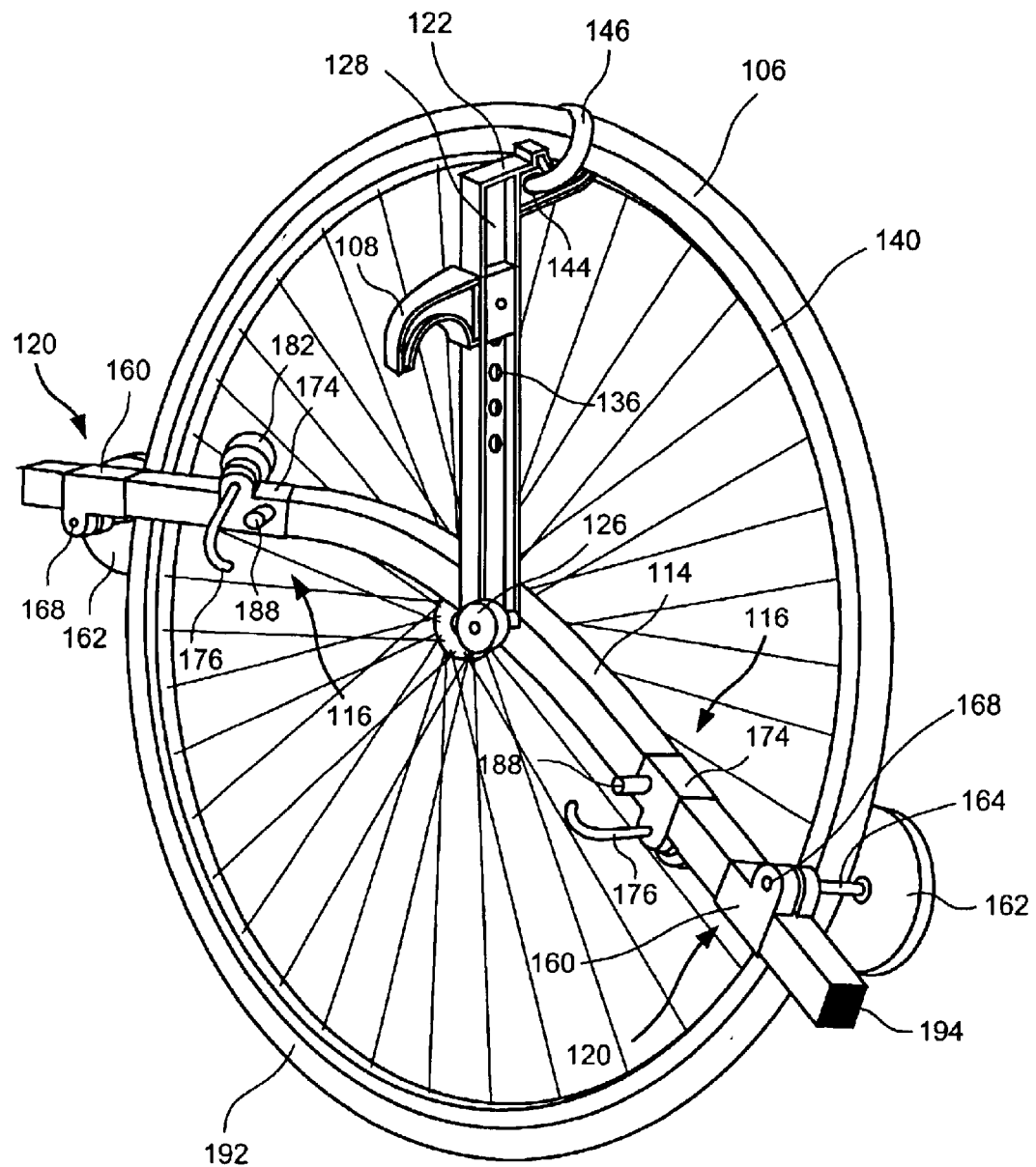
FIG. 2 is an isometric rear view of the wheel holder with a bicycle wheel secured thereto.
Figure 3:
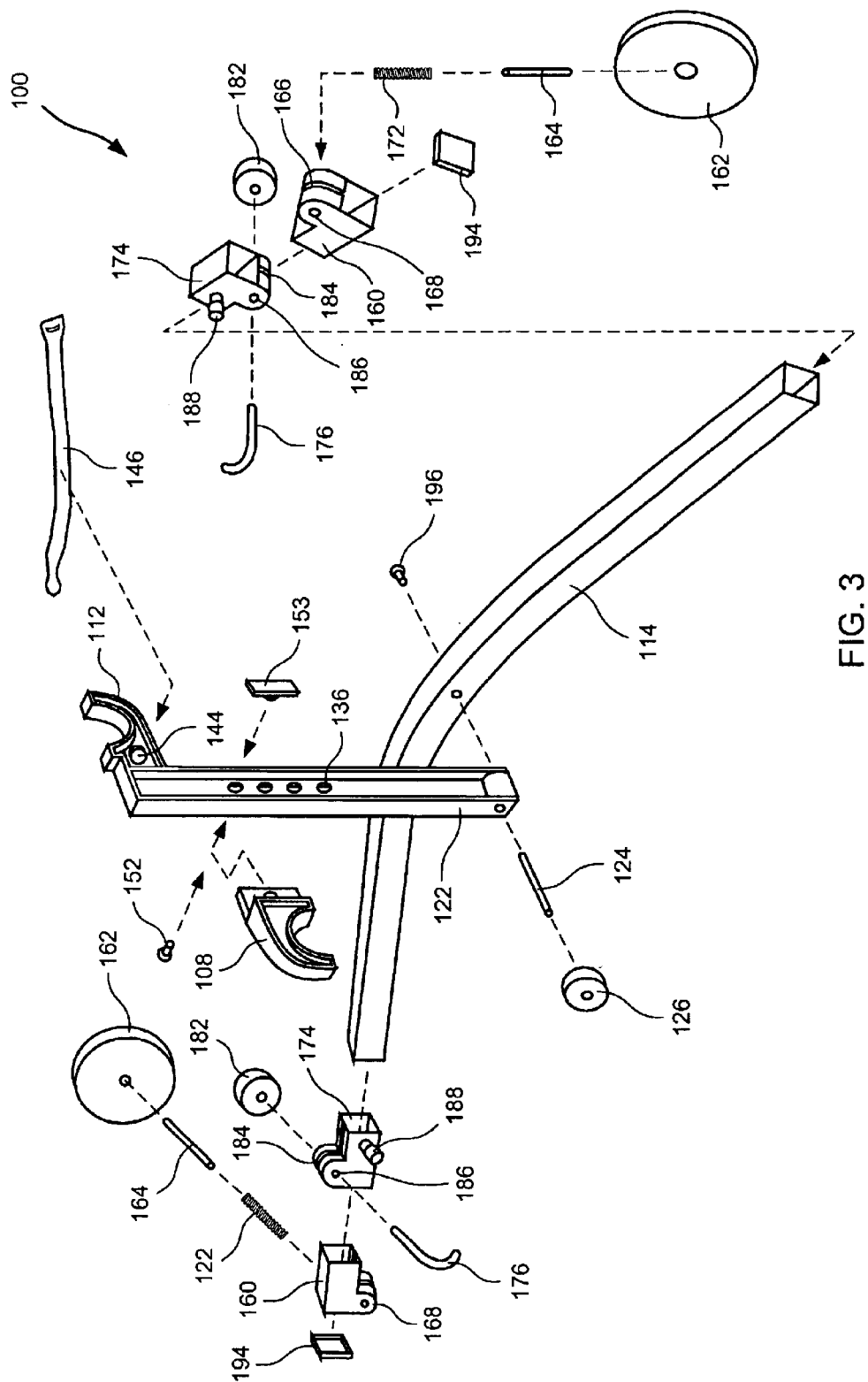
FIG. 3 is an isometric exploded view of the wheel holder

Referring primarily to FIGS. 1 and 3, the preferred embodiment of the wheel holder 100 comprises (i) a column assembly 102 including an integrally formed cradle 104 to receive the rim of a bicycle wheel 106 and a hook 108 to be placed over the top tube 110 of a bicycle frame 112, (ii) a partially curved cross bar 114 pivotally joined to the column assembly, (iii) two frame clamp assemblies 116 for securing the holder to the bicycle frame 112, and (iv) two wheel clamp assemblies 120 for securing the bicycle wheel to the holder.

The column assembly 102 includes a glass-filled nylon molded column member 122. The column member is pivotally attached to the cross bar 114 at the column member's distal end by a threaded bolt 124 that is passed through apertures in both the cross bar and the column member. A small knob 126 with a threaded cavity is provided to secure the threaded bolt in place. In its preferred orientation of use, the elongated column member includes an elongated I-beam portion 128 that extends generally vertically upwardly to a distal top end. The I-beam portion has parallel front and rear flanges 130 joined by a perpendicular web 134. The web has a plurality of horizontally-extending holes 136 passing through it at spaced locations along the length of the I-beam portion. At the distal end of the column member, an integrally-molded cradle arm 104 extends outwardly from the front flange in a substantially horizontal direction that is generally perpendicular to a longitudinal axis of the I-beam portion. The cradle arm has a top surface 138 forming a semi-circular shaped cradle in which the rim 140 of the bicycle wheel 106 can be hung. Preferably, a foam pad 142 (FIG. 5) is bonded to the cradle surface to prevent the marring of the rim. Further, a horizontally-extending aperture 144 is provided through the cradle arm, through which a Velcro strap 146 or similar fastening strap can pass and wrap around the bicycle wheel to hold the wheel in the cradle.

Still referring to FIGS. 1 and 3, the column assembly 102 further comprises the hook member 108. Like the column member, the hook member is molded of a glass-filled nylon. The hook member has a connecting portion 148 adapted to be received in between the flanges 130 of the I-beam 128 with a face thereof abutting the web 134 of the beam. The connecting portion has a hole 150 passing through the abutting face. To attach the hook to the column member, the hole in the hook member is aligned with one of the vertically-spaced holes 136 in the beam, a fastener 152 is passed therethrough, and threaded into a corresponding threaded block 153 that is received between the beam's flanges on the opposite side of the web. It is appreciated by aligning the hole in the hook member with different vertically-spaced holes, the wheel holder can be adjusted for use with bicycle frames 112 of different sizes.

Figure 4:
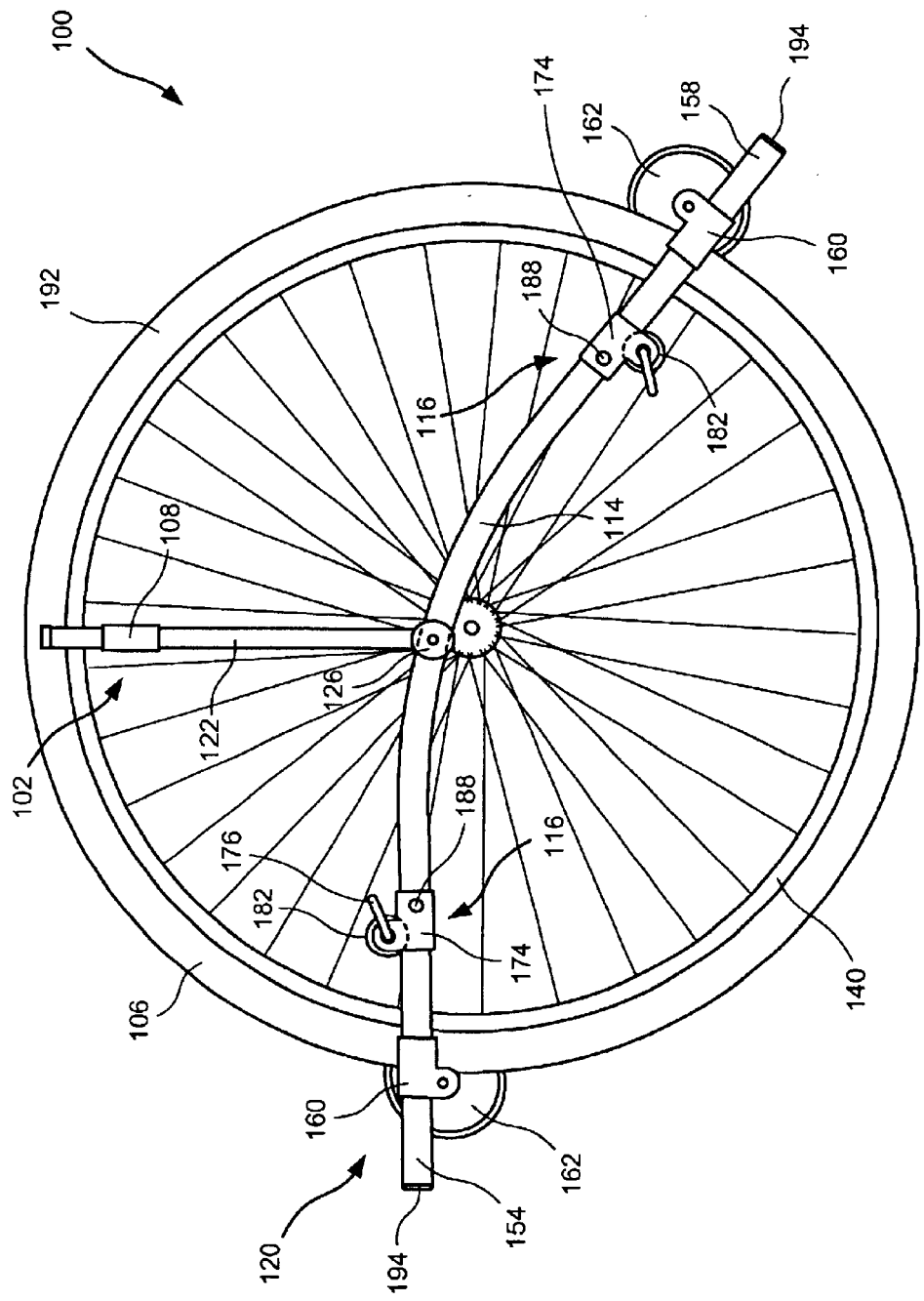
FIG. 4 is a rear view of the holder with a front wheel of the bicycle secured to the holder.

The curved cross bar 114 of the wheel holder is preferably fabricated from a square tube of 6061-T4 aluminum. Referring to FIG. 1, in its preferred orientation of use, the cross bar extends generally linearly and horizontally from a right first end to form a right linear section 154. Next, a center section 156 of the bar is curved to form an arc of around 30 to 50 degrees, preferably 35–45 degrees and most preferably about 40 degrees. From the left end of the center section, the cross bar continues generally linearly in a downwardly and leftwardly direction to a left second end forming a left linear section 158. At the proximate longitudinal center of the cross bar the column assembly is pivotally joined to the cross bar as described above. The wheel clamp and frame clamp assemblies 120 and 116 are slidably received onto the linear sections of the cross bar for attachment of the wheel holder to the bicycle frame and for securing the wheel 106 to the wheel clamp respectively. As best shown in FIG. 4, the frame clamp assemblies 116 are each mounted on one of the respective left or right linear sections of the cross bar closer to the center of the cross bar then the respective left or right wheel clamp assemblies 120. In one embodiment, plastic end caps 194 are provided to cover the open ends of the tubular cross bar.

Each wheel clamp assembly 120 is comprised of a glass-filled molded nylon cross bar clamp 160 and a large circular plastic knob 162 with a threaded steel stud 164 extending perpendicularly from a center thereof. The cross bar clamp includes a square passage therethrough sized to be slidably received on the linear sections 154 and 158 of the cross bar. A slot 166 extends from the interior of the passage through to the outside of the clamp. A bolt hole 168 extends through the clamp perpendicularly across the slot with the section of the bolt hole to the rear of the slot being threaded. The threaded stud 164 is received in a bolt hole 168 in the cross bar clamp. The wheel clamp assembly further includes a coil spring 172 that is received around the threaded stud with one end braced against the back side of the large knob and the other end braced against the cross bar clamp. Accordingly, when the clamp is tightened by turning the large knob clockwise advancing the stud into the bolt hole, the spring is compressed, applying a force across the slot that effectively tightens the wheel clamp around the cross bar to hold the wheel clamp assembly in place.

Figure 5:
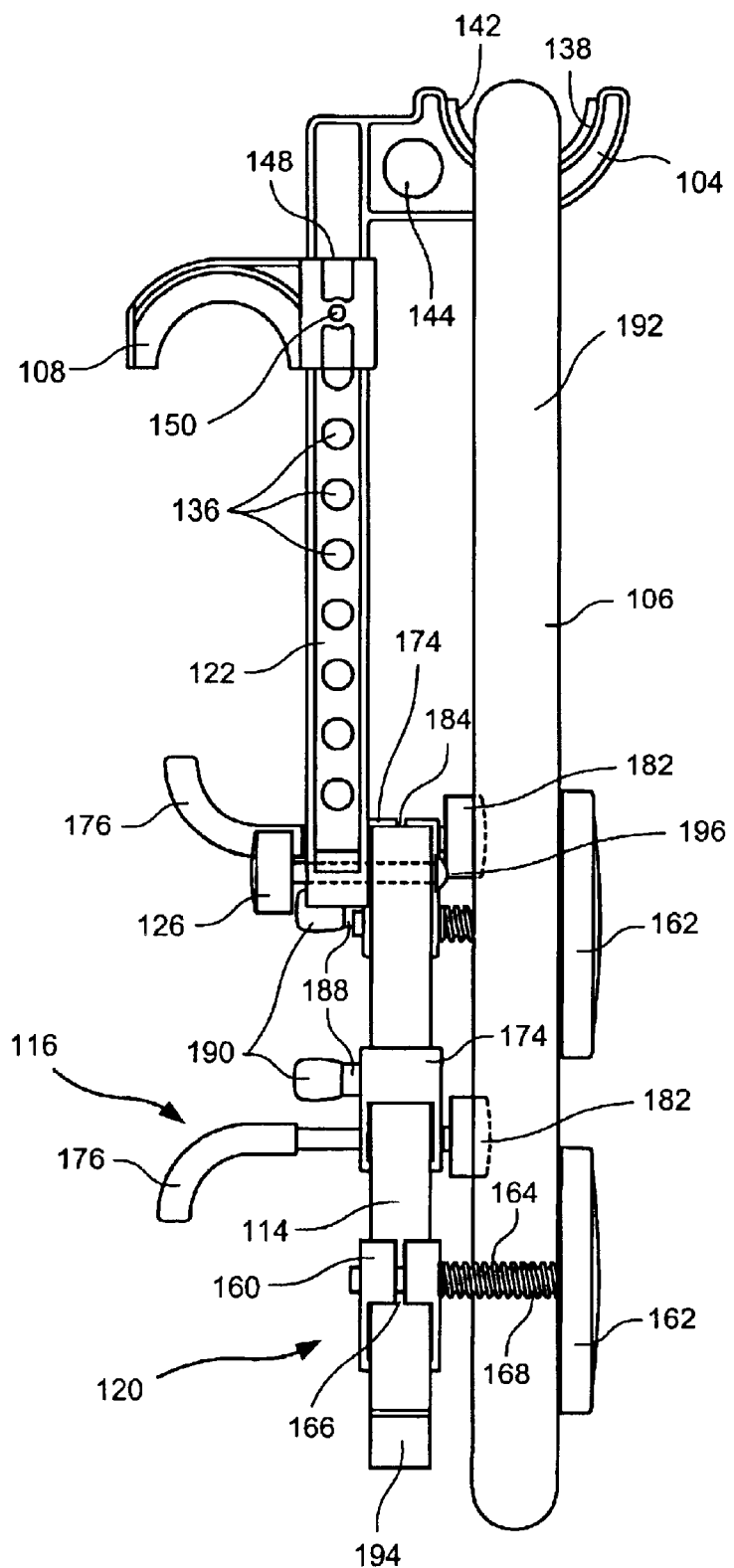
FIG. 5 is a side view of the wheel holder as taken along line 5—5 of FIG. 4.

Each frame clamp assembly 116 is comprised of a glass-filled molded Nylon cross bar clamp 174 that is slidably received on one of the linear sections 154 and 158 of the cross bar, a threaded J-bolt 176 for being hooked around either the bottom tube 178 or seat tube 180 of a bicycle frame and a small plastic knob 182 with a threaded cavity for receiving the J-bolt and providing for the tightening of the J-bolt against the frame 112. The cross bar clamp includes a square passage therethrough sized to be slidably received on the linear sections of the cross bar. A slot 184 extends from the interior of the passage through to the outside of the clamp. A bolt hole 186 extends through the clamp perpendicularly across the slot. Further, a rearwardly extending cylindrical boss 188 extends from the rear side of the clamp. The boss is spaced from the J-bolt such that when the J-clamp assembly is in use. The respective bicycle frame tube is held in between one side of the boss and one side of the J-bolt as best seen in FIG. 5. In the preferred embodiment, a rubber cover 190 is provided to cover the boss of each frame clamp assembly to prevent the boss from scratching or marring the painted surface of the bicycle frame.

In preparation to use the wheel holder to secure a front wheel to a bicycle mounted in a roof top carrier or other type of carrier, the wheel holder 100 is hung from the top tube 110 of the bicycle frame 112. Next, the user moves the frame clamp assemblies 116 into place with the cylindrical bosses 188 of the cross bar clamps 174 placed against the top side of down tube 178 and the left side of seat tube 180 (referring to the orientation of the frame as depicted in FIG. 4). The J-bolts 178 are then rotated into place around the right side of the seat tube and the bottom side of the down tube and secured by tightening them against the respective frame tubes by rotating the associated small knobs 182 clockwise.

If it is not possible to slide the frame clamp assemblies 116 into the proper position on a particular bicycle frame, the position of the hook member 108 of the column assembly 102 may need to be adjusted. Generally, the hook member is lowered to fit smaller bicycle frames and raised to fit larger bicycle frames. To adjust the hook member, the associated fastener 152 is unscrewed from the threaded block 153 and the hook member is moved into the desired location, aligning the hole 150 in the connection portion 148 of the hook member with a corresponding hole of the vertically-spaced holes 136 in the web 134 of the column member's I-beam portion 128. The fastener is passed through the holes and secured in the threaded block. Considering the wheel holder is likely to be used mainly in conjunction with a single bicycle, in most instances the height of the hook member will only need to be adjusted once.

Once the holder 100 is secured to the bicycle frame 112, the front wheel 106 of the bicycle can be secured to the wheel holder. First, the wheel clamp assemblies 120 are slid towards their respective first and second ends of the cross bar so that they are spaced apart a distance greater than the diameter of the wheel to be secured to the holder. Second, the rim 140 of the wheel is placed in the cradle 104 of the column member. Next, the wheel bracket assemblies 116 are slid inwardly towards the tires 192 of the wheel until the spring-covered threaded stud 164 of each assembly is impacting the tire. Finally, the large knobs 162 are rotated clockwise to seat their rear surfaces against the front side of the tire and also to tighten the clamp block 160 in place on the cross bar 114.

It is to be appreciated that the positioning of the wheel clamp assemblies 120 prevents the wheel 106 from both swinging outwardly and moving upwardly as the wheel is jostled during transport as might be caused by wind and uneven terrain in the road the associated vehicle is traversing. The outwardly swing of the wheel is prevented by the large knob 162 as can best be seen in FIG. 5. As can best be seen in FIG. 4, the right wheel clamp assembly is braced against the tire 192 at a location above a horizontal diameter line of the wheel, preventing the wheel from moving vertically upwardly. Similarly the left wheel clamp assembly is located below the horizontal diameter line of the wheel, substantially preventing any vertically downwardly movement, although such movement is also prevented by the cradle 104. To further ensure that the wheel is held securely in the wheel holder, a strap 146 is provided that can be placed through the provided aperture 144 in the cradle portion of the column member and wrapped around the wheel's rim and tire. In the preferred embodiment, the strap includes a hook and loop material for rapid opening and closing of the strap, however, other types of closing mechanisms can be used, such as buckles, snaps and d-rings.

Although this invention has been described with a certain degree of particularity, it is understood that the present disclosure is made by way of example, and changes in the detail, structure and manner of using the invention may be made without departing from the spirit of the invention as defined in the appended claims.

For instance, any number of different materials could be utilized to construct the various components of the wheel holder. For instance, in place of a glass-reinforced nylon one or more of the column member, the hook member, and the cross bar clamps could be fabricated from other polymeric materials, reinforced and unreinforced, or one or more of these parts could be comprised of a wrought, cast or machined metal, such as aluminum or magnesium. The large and small knobs could be fabricated from any number of materials as well in place of plastic, such as wood or metal. Additionally, the cross bar could be fabricated from a reinforced or unreinforced plastic material or another metallic material, such as steel or magnesium, in place of the specified aluminum.

The clamping mechanisms described above are also merely exemplary and many other alternative structures are contemplated for attaching the holder to a bicycle frame and securing a wheel to the holder. For instance, straps can be utilized in place of the frame clamp assemblies or the wheel clamp assemblies. Additionally, the structure of the various clamps, the cradle and the hook member are not considered crucial to the function of the wheel holder provided any alternative structure can accomplish the intended function of either attaching a framework of the wheel holder to the bicycle frame or securing a wheel.

The structure of the wheel holder's framework can also vary substantially. For instance, the pivotal connection between the cross bar and a vertical column member may not be utilized with a column being fixedly joined, or even integrally molded, with a cross bar. Further, the framework of the holder may bear little resemblance to the exemplary framework provided by the column member and the cross bar. Numerous other framework configurations are possible as would be obvious to one of ordinary skill in the art.

What is claimed is:

1. An apparatus for attachment to a bicycle frame and for holding a bicycle wheel, the apparatus comprising:
   a framework;
   two or more coupling devices attached to the framework, the two or more coupling devices being adapted to attach to one or more tubes of the bicycle frame at two or more locations, at least one of the two or more locations being one of a top tube and a down tube; and
   one or more attachment devices attached to the framework, the one or more attachment devices being adapted to hold the bicycle wheel and prevent the bicycle wheel from one or both of moving upwardly and swinging outwardly relative to the framework during transport of the bicycle frame.

2. The apparatus of claim the 1, wherein the one or more attachment devices includes an upwardly-open cradle for receiving a rim of the bicycle wheel therein.

3. The apparatus of claim 2, wherein the one or more attachment devices further include at least one clap assembly for hindering the movement of the wheel when the wheel is hung in the cradle.

4. The apparatus of claim 1, wherein the framework comprises a cross bar, the cross bar having at least one of the two or more coupling devices and the one or more attachment devices attached thereto for slidable movement longitudinally along at least a portion of the cross bar.

5. The apparatus of claim 4, wherein the cross bar comprises a tube.

6. The apparatus of claim 4, wherein the cross bar is not longitudinally linear.

7. The apparatus of claim 4, wherein the framework further includes a columnar member having a proximal end pivotally attached to the cross bar, the columnar member further having at least one of the two or more coupling devices attached thereto.

8. The apparatus of claim 7, where in the one or more attachment devices includes an upwardly-open cradle for receiving a rim of the bicycle wheel therein, and wherein the cradle is attached to the framework proximate a distal end of the columnar member.

9. An apparatus for attachment to a bicycle frame and for holding a bicycle wheel, the apparatus comprising:
   a framework;
   two or more coupling devices attached to the framework, the two or more coupling devices being adapted to attach to one or more tubes of the bicycle frame at two or more locations;
   one or more attachment devices attached to the framework, the one or more attachment devices being adapted to hold the bicycle wheel; and
   wherein the two or more coupling devices include at least one downwardly open a hook adapted to be received over a top tube of the bicycle frame.

10. The apparatus of claim 9, wherein the two or more coupling devices further include at least one coupling device adapted to be secured to a seat tube of the bicycle frame.

11. The apparatus of claim 10, wherein the two or more coupling devices further include at least one coupling device adapted to be secured to a downtube of the bicycle frame.

12. An apparatus for attachment to a bicycle frame and for holding a bicycle wheel, the apparatus comprising:
   a framework;
   a hook coupled with the framework, the hook being adapted to hang over a top tube of the bicycle frame; and
   a cradle coupled with the framework, the cradle being adapted to receive a rim of the bicycle wheel therein.

13. The apparatus of claim 12, further comprising one or more frame clamp devices coupled with the framework, the one or more frame clamp devices being adapted for securing the framework to the bicycle frame.

14. The apparatus of claim 13, wherein the one or more frame clamp devices include at least two frame clamp devices, one for attachment to a downtube of the bicycle frame and the other for attachment to a seat tube of the bicycle frame.

15. The apparatus of claim 12, further comprising one or more wheel clamp devices coupled with the framework, the one or more wheel clamp devices being adapted to secure the bicycle wheel to the framework.

16. The apparatus of claim 15, where in the one or more wheel clamp devices include at least two wheel clamp devices, each abutting a tire of the bicycle wheel.

17. The apparatus of claim 16, further comprising one or more frame clamp devices coupled with the framework, wherein the one or more frame clamp devices include at least two frame clamp devices, one for attachment to a down tube of the bicycle frame and the other for attachment to a seat tube of the bicycle frame.

18. The apparatus of claim 17, wherein the framework includes a cross bar member and a columnar member, the columnar member being pivotally connected to the cross bar member and having the hook and the cradle extending therefrom, the at least two frame clamp devices and the at least two wheel clamp devices all being slidably attached to the cross bar.

19. The apparatus of claim 17, where in the cross bar has an arcuate center portion with two linear portions extending from the arcuate portion.

20. A method for securing a bicycle wheel to a bicycle frame of a bicycle, the method comprising:

suspending a wheel holder assembly to a top tube of the bicycle frame, the wheel holder assembly including (i) a framework, (ii) a hook coupled with the framework, the hook being adapted to hang over the top tube of the bicycle frame, (iii) a cradle coupled with the framework, (iv) at least one frame clamp attached to the framework, and (v) at least one wheel clamp attached to the framework;

securing the wheel holder to at least one of a seat tube and a down tube of the bicycle frame using the at least one frame clamp;

hanging the bicycle wheel by placing a rim of the bicycle wheel in the cradle; and securing the bicycle wheel to the wheel holder at least one of a tire and a rim of the bicycle wheel using the at least one wheel clamp.

21. A method of securing a bicycle wheel to a bicycle frame of a bicycle when the bicycle is mounted in a vehicle carrier for transport, the method comprising:

attaching a wheel holder to at least two of a top tube, a seat tube and a down tube of the bicycle frame; and preventing substantial movement of the bicycle wheel relative to the wheel holder by securing the bicycle wheel to the wheel holder.

22. The method of claim 21, wherein said securing the bicycle wheel to the wheel holder comprises clamping the bicycle wheel to the wheel holder at least one of a tire and a rim of the bicycle wheel.

23. The method of claim 21, wherein said preventing substantial movement of the bicycle wheel includes inhibiting the bicycle wheel from swinging outwardly relative to the wheel holder and moving upwardly relative to the wheel holder as the bicycle is being transported by an associated vehicle.

24. A combination comprising:

an automobile;

a roof rack attached to the top of the automobile;

a bicycle having a bicycle frame, the bicycle being attached to the roof rack, a front wheel of the bicycle having been removed from a front fork of the bicycle;

a wheel holder assembly, the wheel holder assembly being attached to the bicycle at least three locations with at least two of the locations being on at least two of a down tube, a seat tube and a top tube of the bicycle frame; and the front wheel, the front wheel being secured to the wheel holder assembly.

* * * * *